(12) United States Patent
Gattass et al.

(10) Patent No.: US 9,785,033 B2
(45) Date of Patent: Oct. 10, 2017

(54) COMPACT INFRARED BROADBAND SOURCE

(71) Applicants: Rafael R. Gattass, Washington, DC (US); Jasbinder S. Sanghera, Ashburn, VA (US); L. Brandon Shaw, Woodbridge, VA (US)

(72) Inventors: Rafael R. Gattass, Washington, DC (US); Jasbinder S. Sanghera, Ashburn, VA (US); L. Brandon Shaw, Woodbridge, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 111 days.

(21) Appl. No.: 14/608,473

(22) Filed: Jan. 29, 2015

(65) Prior Publication Data

US 2015/0212387 A1    Jul. 30, 2015

Related U.S. Application Data

(60) Provisional application No. 61/933,327, filed on Jan. 30, 2014.

(51) Int. Cl.
*G02F 1/35* (2006.01)
*H01S 3/06* (2006.01)
(Continued)

(52) U.S. Cl.
CPC ............ *G02F 1/353* (2013.01); *H01S 3/0092* (2013.01); *H01S 3/0627* (2013.01);
(Continued)

(58) Field of Classification Search
CPC ..... G02F 2001/3507; G02F 2001/3528; G02F 1/3526; G02F 1/353; G02F 1/355;
(Continued)

(56) References Cited

U.S. PATENT DOCUMENTS 6,928,227 B2 * 8/2005 Shaw ................. H01S 3/063
359/334
7,130,512 B2 * 10/2006 Kuksenkov ........ G02B 6/02242
385/122

(Continued)

OTHER PUBLICATIONS

Zayhowski et al., "Miniature sources of subnanosecond 1.4-4.3-um pulses with high peak power," Advanced Solid State Lasers 34, TuA11 (2000).

(Continued)

*Primary Examiner* — Daniel Petkovsek
(74) *Attorney, Agent, or Firm* — US Naval Research Laboratory; Rebecca L. Forman

(57) ABSTRACT

A device for the generation of supercontinuum in infrared fiber with a pump light comprising a microchip laser operating with a wavelength of 1.0 μm or greater that can be wavelength shifted though a nonlinear element to a wavelength beyond the two-photon absorption of the infrared fiber and launched into infrared fiber whereby the spectrum is broadened in the infrared fiber through various nonlinear processes to generate a supercontinuum within the mid-IR from 2 to 14 μm.

12 Claims, 3 Drawing Sheets

(51) Int. Cl.
 *H01S 3/00* (2006.01)
 *G02F 1/365* (2006.01)
 *H01S 3/16* (2006.01)
(52) U.S. Cl.
 CPC ............ *G02F 1/3526* (2013.01); *G02F 1/365* (2013.01); *G02F 2001/3507* (2013.01); *G02F 2001/3528* (2013.01); *H01S 3/1611* (2013.01); *H01S 3/1643* (2013.01)
(58) Field of Classification Search
 CPC ........ G02F 1/365; G02F 1/395; H01S 3/0092; H01S 5/0092
 See application file for complete search history.

(56) References Cited

U.S. PATENT DOCUMENTS

| | | | |
|---|---|---|---|
| 7,133,590 B2* | 11/2006 | Shaw | G02B 6/02214 359/332 |
| 7,519,253 B2 | 4/2009 | Islam | |
| 7,809,030 B2 | 10/2010 | Shaw et al. | |
| 8,422,519 B2* | 4/2013 | Knight | G02B 6/02347 372/6 |
| 8,731,009 B2* | 5/2014 | Buchter | G02F 1/365 372/21 |
| 9,213,215 B2 | 12/2015 | Shaw et al. | |
| 2006/0002437 A1* | 1/2006 | Braun | G02F 1/365 372/22 |
| 2012/0027031 A1* | 2/2012 | Liu | G02B 6/02214 372/6 |
| 2013/0188240 A1* | 7/2013 | Shaw | G02F 1/3532 359/326 |
| 2015/0288133 A1* | 10/2015 | Salem | G02B 21/361 250/339.07 |

OTHER PUBLICATIONS

Zayhowski et al., "Miniature Gain-Switched Lasers," Advanced Solid-State Lasers 50, SA1 (2001).

* cited by examiner

COMPACT INFRARED BROADBAND SOURCE

PRIORITY CLAIM

The present application is a non-provisional application claiming the benefit of U.S. Provisional Application No. 61/933,327, filed on Jan. 30, 2014 by Rafael R. Gattass et al., entitled "Compact Infrared Broadband Source," the entire contents of which is incorporated herein by reference.

BACKGROUND OF THE INVENTION

Field of the Invention

The present invention relates to optical supercontinuum generation or broadening of bandwidth of an optical signal whereby wavelength of the signal is broadened between about 2 and 14 microns.

Description of the Prior Art

Nonlinear optical phenomena can be used to convert light from one wavelength to another, but it can also convert a narrow bandwidth wavelength source into a broadband source. The generation of a broadband source through a combination of nonlinear phenomena is typically called supercontinuum generation. In supercontinuum generation, pulses of femtoseconds (fs) to nanoseconds (ns) are spectrally broadened by various nonlinear processes, including self-phase modulation, stimulated Raman scattering and four wave mixing, dependent on the pump temporal properties and the dispersion slope of the fiber. While supercontinuum generation is possible by focusing a high intensity light into a nonlinear medium, much broader bandwidths and significantly lower thresholds are possible when the pump is coupled into an optical fiber where the guiding characteristics of the fiber allow the pump to interact with the nonlinearities of the fiber materials over long lengths.

Among the various available high power laser pumps, microchip laser sources are compact, capable of pulse widths below 5 ns (typical values range from 40 ps to 5 ns), and repetition rates from Hz to MHz. Modal profile for these lasers is very good, usually being below $M^2<1.5$. Multiple material systems allow for the development of microchip laser architectures with emission wavelength spanning visible to mid-IR. Such lasers are usually based on rare-earth elements such as Nd, Yb, Er, Dy, Pr, Sm, Eu, Ho, and Tm but may also include Cr, Fe, and other transition metal ions. These active dopants are supported in a host that can be a crystalline material such as yttrium aluminum garnet (YAG), yttrium lithium fluoride (YLF), yttrium orthovanadate (YVO4), yttrium aluminum perovskite, potassium-gadolinium tungstate (KGW), yttrium scandium gallium garnet (YSGG), ZnSe, and others; ceramic materials such as lutetium oxide, spinel, yttrium oxide, and others; glass materials such as germanates, fluorides, ZBLAN, chalcogenides, tellurites, and others. Other examples include transition metal ($TM^{2+}$, e.g., $Cr^{2+}$ or $Fe^{2+}$) doped binary (e.g. ZnSe, ZnS, CdSe, CdS, ZnTe) and ternary (e.g., CdMnTe, CdZnTe, ZnSSe) chalcogenide crystals and ceramics.

Microchip lasers are a unique class of laser systems with many properties distinct from those from other laser architectures such as laser diode or fiber lasers. Of particular importance to the present invention are pulsed microchip lasers, as the peak power of these systems can be very high, easily exceeding kW peak powers in a package whose volume can be on the order of $cm^3$. The high peak power avoids the need for further amplification of these laser systems, the short length of the microchip laser provides a short-pulse without the need to resort to optical pulse modulation, external pulse shaping elements or nonlinearly induced pulse break-up such as modulation instability.

Compared to focusing into a nonlinear medium, optical fibers allow for long interaction lengths through optical waveguiding. An optical fiber comprises a core surrounded by one or more claddings. Light travels in the core and is confined by the index difference between the core and cladding. Microstructured fiber or photonic crystal fiber is a fiber whereby the cladding (or claddings) comprises a geometric arrangement of air holes in the cladding glass. Inhibit coupling fiber is a hollow core fiber whereby the density of light states is reduced but non-zero and the modal overlap between the air guided mode and the substrate mode (cladding mode) is minimal, allowing light to be guided in the hollow mode with low loss.

Supercontinuum generation has been demonstrated in silica fiber in the visible and near infrared. Unfortunately, transmission of the silica glass matrix limits the supercontinuum generation to less than about 2 µm. For supercontinuum generation in the infrared, alternate technologies and materials are needed.

Chalcogenide fiber is one technology capable of transmission well beyond 2 µm. Chalcogenide fibers are fibers comprising the chalcogen elements, sulfur, selenium, and tellurium. Typically, other elements are added to stabilize the glass. Arsenic sulfide, $As_2S_3$, and arsenic selenide $As_2Se_3$, germanium arsenic sulfide, germanium arsenic sulfide telluride, and germanium arsenic selenide are examples of chalcogenide glass. Chalcogenide fibers typically do not transmit well in the visible range. The use of high peak power pumps for supercontinuum generation in these fibers risks damage from two-photon absorption, so pumps in the wavelength range greater than 1.5 µm are typically used.

Many of the microchip lasers previously described are capable of laser emissions above 1.5 um, however sources with emissions below 1.5 um and for those applications where power is preferred to remain within a specified wavelength band, a nonlinear element can be used in conjunction with the laser to shift the color of the laser to a longer wavelength. Examples of nonlinear elements are bulk nonlinear material with sufficient transmission at the pump wavelength. Examples are nonlinear crystals such as lithium triborate (LBO), beta barium borate (BBO), zinc germanium phosphide (ZGP), potassium dihydrogen phosphate (KDP), silver thiogallate (AGS), silver selenogallate (AGSe), gallium selenide (GaSe), lithium indium sulfide ($LiInS_2$), lithium indium selenide (LISe), and others. Alternatively, high-efficient conversion is also possible with quasi-phase matched material such as periodically poled lithium niobate, periodically poled potassium titanyl phosphate, or periodically patterned gallium arsenide, and others. Besides conversion in devices with high second order nonlinearity ($\chi^{(2)}$), conversion can be induced through Raman shifting as in the case of Raman converters. Examples of Raman converters can be in the form of a gas-cell, an optical fiber or crystal.

For those alternatives for nonlinear conversion where second order nonlinearity is used for the wavelength conversion, the present invention does not require the use of a cavity, ensuring a compact and stable laser source. The method focuses on wavelength conversion through optical parametric generation, not requiring a set of mirrors to form a cavity. A single pass configuration for the optical parametric generation is preferred. Alternatively, a method where wavelength conversion prior to coupling into the fiber occurs through optical parametric amplification. Optical parametric amplification requires the use of seed laser increasing the complexity of the system, however it can be used to narrow the converted bandwidth, improve the mode or increase the power conversion.

Many applications exist for bright broadband infrared sources beyond about 2 µm. Of particular interest are light sources in the chemical and biological "fingerprint region" from 3-12 µm for biological and chemical sensing and sources within the atmospheric transmission windows from 2-5 µm and 8-12 µm for infrared countermeasures and certain radar (LIDAR) applications. Other applications for such sources include infrared illuminators and infrared sources for hardware-in-the-loop testing. Supercontinuum sources in the infrared would enable these applications. For these applications, the size and weight of the light source are of particular importance. In particular there is growing interest in portable sources (weight on the order of 20 kg, dimensions on the order of 20 cm×20 cm×20 cm). Current inventions do not address the size and weight limitations currently needed.

Shaw (U.S. Pat. No. 7,133,590) teaches a method of generating supercontinuum in a chalcogenide fiber, either conventional core/clad fiber or microstructured photonic crystal fiber within the range of 2 to 14 µm by launching pump light into a chalcogenide fiber whereby the input pump light is broadened by several nonlinear mechanisms in said fibers. However, the invention describes supercontinuum generation in fibers wherein the pump light propagates at a wavelength that is in the anomalous or near-zero dispersion.

Islam (U.S. Pat. No. 7,519,253) teaches a system and method to generate said broadband supercontinuum in either chalcogenide, fluoride, or tellurite fiber with a pump light consisting of a short pulse laser diode with wavelength of shorter than 2.5 µm and pulse width of at least 100 ps with one or more optical amplifier chains and a nonlinear fiber with anomalous dispersion at the diode wavelength that modulates the diode though modulation instability. In addition to the modulation instability stage, the invention requires the use of an amplification stage after the laser pump, increasing the weight and complexity of any device based on this invention. The invention does not teach how to overcome the challenges with the use of other pumps systems such as microchip lasers, and those whose wavelength lie in the normal dispersion regime of the fiber. It also requires the amplification of the pump signal to at least 500 W peak power in a second element such as a fiber amplifier.

Shaw (U.S. Pat. No. 7,809,030) teaches a method for converting light to the infrared through the use of AsS chalcogenide fibers pumped by an optical parametric oscillator. The invention does not disclose how to overcome the challenges with the use of other chalcogenide fiber materials such as AsSe, and GaAsSeTe, as well as the challenges associated with the use of nonlinear conversion without the use of a cavity.

Shaw (U.S. patent application Ser. No. 13/742,563) teaches a method for generating supercontinuum light in the mid-infrared through the use of a fiber based pump source. Although the invention does focus on propagation in the normal dispersion regime, it does not address the challenges involved in using a micro-optic packaged system or bulk system for pumping a fiber within this regime.

Zayhowski ("Miniature sources of subnanosecond 1.4-4.3 µm pulses with high peak power," in Advanced Solid State Lasers 34, TuA11 (2000), "Miniature gain-switched lasers," in Advanced Solid-State Lasers 50, WA1 (2001)) teach a method for fabricating compact miniature laser sources with high peak power and narrow bandwidths centered on wavelengths within the range of 1 to 4.3 µm. The cited work does not teach a method for generating broadband wavelength emission within this range or how to extend the range further into the infrared.

BRIEF SUMMARY OF THE INVENTION

The aforementioned problems are overcome in the present invention which provides a method and device for a compact light source based on a microchip laser, a nonlinear optical element and a fiber-based wavelength transmuter. The output of the source will have a bandwidth exceeding the input laser bandwidth by at least 100% and with an emission wavelength range within the range of 2 and 14 micrometers.

The method described above enables compact broadband infrared fiber source with high power and high brightness emission. Examples of the size and weight of a compact microchip based system can be found in the literature, the size of a microchip element, nonlinear element can be on the order of 10 $in^3$, the optical fiber and coupling do not add any significant weight (<100 g) and can serve to route the signal to an intended emission aperture. Such a source would have applications in spectroscopy, LIDAR, IRCM, laser surgery, and free space communications.

The device has advantages over other mid-IR supercontinuum sources demonstrated. Source have been demonstrated in fluoride fiber, however, they have only been able to reach ~4.3 µm using all fiber pumping. Sources have reached beyond 5 µm using short length of fluoride fiber and large bulky Ti:Sapphire based OPA pumps, however, these systems are not compact and the average power was typically very low (<50 mW). The source described in this invention can be designed to operate anywhere in the transparency range of the fiber by choosing the appropriate pump, nonlinear element and power. The fiber acts to extend that range of wavelengths accessible by nonlinear conversion while simultaneously broadening the spectrum of the system. The choice of a microchip based pump or a similarly compact laser pump (e.g. high power quantum cascade laser) simplifies the number of elements in the pump laser system, reducing not only the size and weight of the system, but also reducing the number of failure points for the system. The system described is scalable to multi-watt power in a micro-optics package.

The proposed architecture for the device and method have the advantage of allowing for the isolation of the electrical and thermal management required for more complex systems (previously cited) from the optically active components.

These and other features and advantages of the invention, as well as the invention itself, will become better understood by reference to the following detailed description, appended claims, and accompanying drawings.

microlenses, (C) nonlinear element such as PPLN crystal (example dimensions 10 mm×1 mm, 20 mm long), and (E) infrared fiber such as AsSe fiber (example dimensions 10 um core, 200 um cladding, 2 m long).

Figure 4:
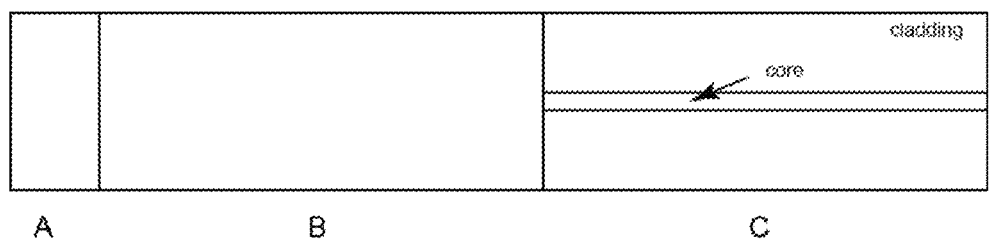

FIG. 4 shows a side view of sample geometry to be used in a method for generating broadband light (not to scale) showing pump, nonlinear element and fiber all mechanically bonded including (A) pump laser, (B) nonlinear element, and (C) infrared fiber.

Figure 5:
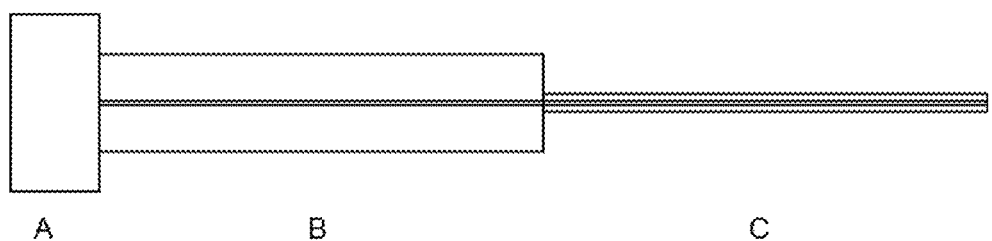

FIG. 5 shows a side view of sample geometry to be used in a method for generating broadband light (not to scale) having a low-power threshold broadband source module with pump laser (A) coupled into waveguide supported nonlinear element (B) such as waveguide PPLN chip, coupled to infrared fiber (C).

Figure 6:
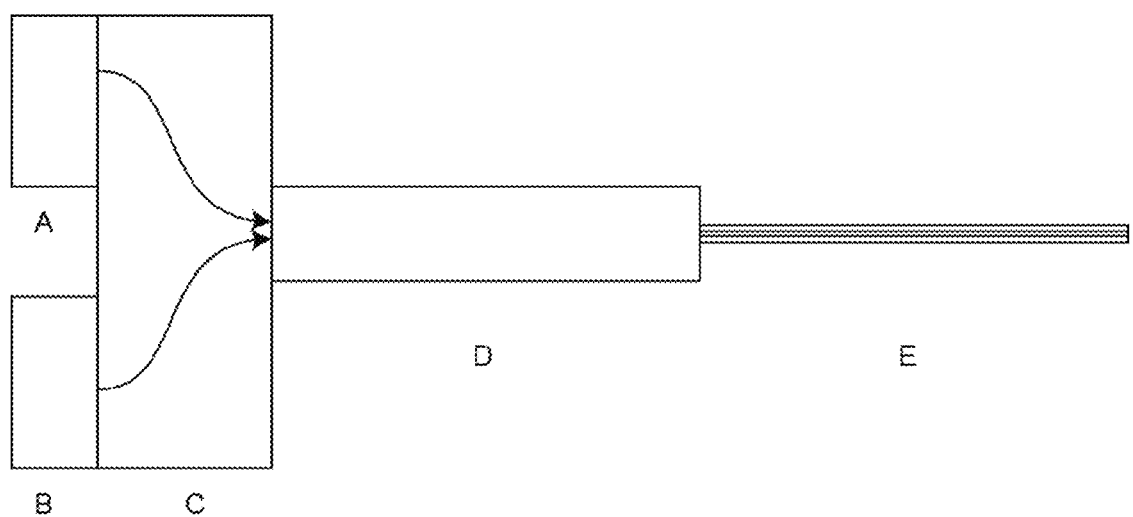

FIG. 6 shows a side view of sample geometry to be used in a method for generating broadband light with optical parametric amplification as a main method for wavelength conversion in nonlinear element (not to scale) including (A) pump laser, (B) seed laser, (C) beam coupler, (D) nonlinear element, and (E) infrared fiber. Coupling between elements might require lenses depending on the beam sizes and geometries.

DETAILED DESCRIPTION OF THE INVENTION

The present invention provides a method and device for generation of supercontinuum in infrared fiber with a pump light comprising a laser operating with wavelength of 1.5 µm or greater that can be wavelength shifted though a nonlinear element and launched into infrared fiber whereby the spectrum is broadened in the infrared fiber through various nonlinear processes to generate a supercontinuum within the mid-IR from 2 to 14 µm.

Figure 1:
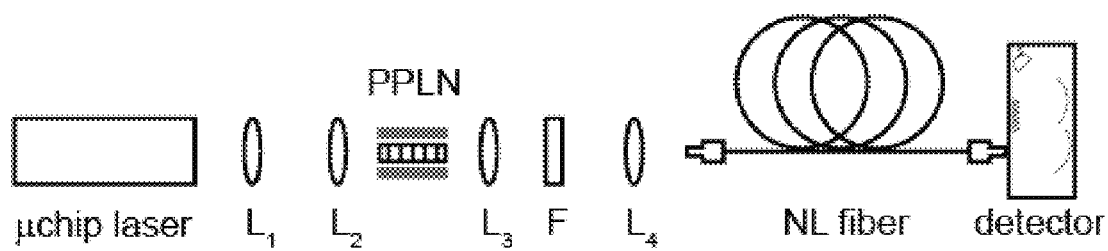
FIG. 1 is a schematic of compact supercontinuum device used for demonstration. L1-L4: collimation and focusing lenses. F: Long pass 2500 nm filter. Detector indicates the fiber coupled scanning monochromator. The band around the PPLN indicates a temperature controlled oven.
Figure 2:
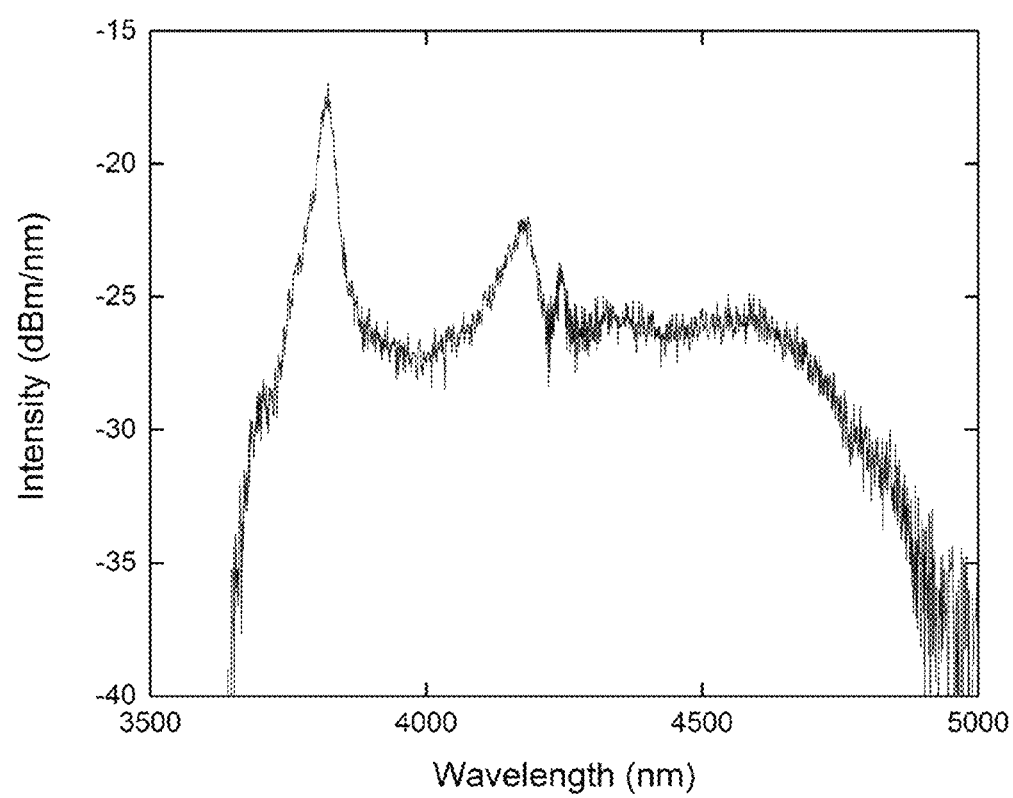
FIG. 2 shows broadband light emission from chalcogenide fiber pumped with a compact microchip laser.

In one embodiment, a Nd:YAG microchip laser operating at 1.064 µm with pulse width of 700 ps and repetition rate of 20 kHz is used as a pump for optical parametric generation in a periodically poled lithium niobate crystal. The crystal period is set such that the 1.064 µm generates a 1.45 µm pulse and a 3.82 µm pulse in a single pass configuration (with no seed or cavity). The 3.82 µm pulse is coupled into a selenide-based optical fiber of approximately 2 m length, with an effective core diameter of 12 µm. The chalcogenide fiber broadens the light by various nonlinear phenomena to a bandwidth between 3.65 and 4.90 µm. FIG. 1 shows a schematic of the demonstration. FIG. 2 shows the spectrum of the generated supercontinuum.

Figure 3:
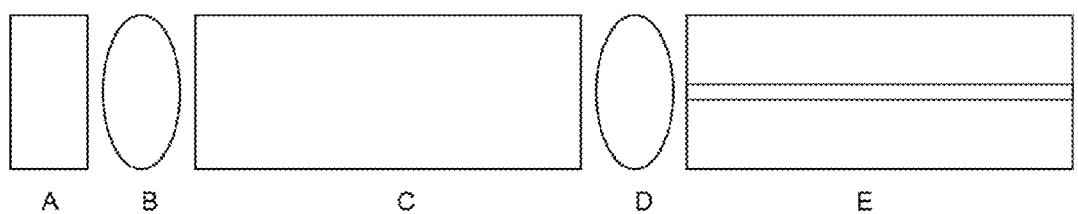
FIG. 3 shows a side view of sample geometry to be used in a method for generating broadband light (not to scale) including (A) pump laser such as microchip laser (example sample dimensions 2 mm×2 mm, 1 mm long), (B) and (D)

A sample schematic of a device based on the method described herein is shown in FIG. 3. A narrowband pump source from a microchip laser coupled into a nonlinear element through a lens. The pump light is converted to two (or more) wavelengths in a nonlinear element. The longer wavelength (say $\lambda_1$) light is coupled to a non-linear fiber through another lens. The dispersion of the chalcogenide fiber can be normal, zero, or anomalous at the input $\lambda_1$ wavelength, and the generated broadband light is emitted in the infrared within the range of 2 to 14 µm.

A variation of the sample schematic in FIG. 3 is presented in FIG. 4. Here the microchip laser, nonlinear element and fiber are bonded together either mechanically or optically with no need of imaging optics.

A variation of the sample schematic in FIG. 3 is presented in FIG. 5. Here the nonlinear element also allows for waveguiding of the light, and is aligned such that the output of the nonlinear element is coupled into an infrared fiber.

A waveguiding nonlinear element use in an architecture such as that described in FIG. 5 or the one in FIG. 3, could comprise a fiber based Raman shifter or waveguide inscribed second order nonlinear element such as a waveguide based periodically poled lithium niobate chip. Note that neither of these elements requires that the dispersion of light at the input wavelength be anomalous and do not base their wavelength conversion on a physical mechanism called modulation instability. The use of a waveguide nonlinear element also allows for conversion of light at very low peak powers, with efficiency >5% possible even for light powers well below 500 W.

The narrowband pump source can be a q-switched laser system, including microchip lasers with emission from 1 to 5 µm such as but not restricted to Nd:YAG lasers, Er:YAG lasers, Er:ZBLAN, as well as high power quantum cascade lasers (a wider list of materials has been presented in the background section). The nonlinear element need not be present if the pump source is sufficiently long wavelength as to avoid two-photon absorption in the fiber. Here the nonlinear fiber can comprise an appropriately transparent material such as fluoride, tellurite, germanate, halide or chalcogenide glass.

Chalcogenide glass fibers suitable herein include fibers with outer diameter (O.D.) typically in the range of 50-1000 µm, and more typically in the range of 100-500 µm. Core size is in the range of 1-100 µm in diameter, but typically range from smaller cores of about 1 µm in diameter to larger cores of about 50 µm in diameter. Generally speaking, the smaller the core the higher the energy density and the broader the bandwidth, for a given power. In order to keep light within the core, its refractive index is kept higher than that of the clad.

Examples of nonlinear elements supported by this method and device presented in this patent include nonlinear elements composed of a quasi-phase matched material such as periodically poled lithium niobate, periodically poled potassium titanyl phosphate, or periodically patterned gallium arsenide. Other nonlinear elements are also possible as those experienced in the field would know, as long as there is sufficient transmission at the pump wavelength through the nonlinear material. Examples are nonlinear crystals such as lithium triborate (LBO), beta barium borate (BBO), zinc germanium phosphide (ZGP), potassium dihydrogen phosphate (KDP), silver thiogallate (AGS), silver selenogallate (AGSe), gallium selenide (GaSe), lithium indium sulfide (LiInS2), lithium indium selenide (LISe). Additionally, the nonlinear element can be based on a Raman converter. The Raman converter can be in the form of a gas-cell, an optical fiber or crystal.

A method where by frequency conversion prior to coupling into the fiber occurs through optical parametric generation, not requiring a set of mirror to form a cavity. A single pass configuration for the optical parametric generation is preferred. Alternatively, a method where frequency conversion prior to coupling into the fiber occurs through optical parametric amplification—where a seed is used to narrow the converted bandwidth, improve the mode or increase the power conversion. One arrangement for the case of optical parametric amplification is presented in FIG. 6. The power of the pump laser and a weaker seed laser are combined and coupled into a nonlinear element. The combination can occur through a dichroic mirror, a polarization element, evanescent coupler, interferometric waveguide combination or any other beam combiner. The polarization of the seed laser is selected to maximize the energy conversion from the pump laser to the new wavelength, and does not need to be the same as the pump. The effect of the polarization on the conversion efficiency should be clear for those knowledgeable in the art, and will depend on the nonlinear element architecture used.

A method whereby the pump laser is selected to maximize the power transfer to a Raman line or a cascade of Raman lines in an infrared fiber. The nonlinear element used after the pump would generate two new wavelengths with the energy spacing being close to or within the Raman gain of the fiber. One such embodiment would include the use of a pump laser and nonlinear element to generate such that the power carried at the pump wavelength $\lambda_p$ would be efficiently converted to two new wavelengths $\lambda_1$ and $\lambda_2$ where the spacing of the wavelengths would be chosen such that $(\lambda_1)^{-1}+(\lambda_2)^{-1}=\Lambda\pm d\Lambda$, where $\Lambda$ is the Raman gain peak for the infrared fiber (in inverse wavenumbers) and $d\Lambda$ represents the bandwidth of the gain. For example for $As_2S_3$, $\Lambda$ would be 340 cm$^{-1}$ and $d\Lambda$ would be 60 cm$^{-1}$. In this embodiment of the method, the power carried by both $\lambda_1$ and $\lambda_2$ would be coupled into the infrared fiber. Nonlinear propagation in the fiber together with Raman gain would lead to broadening of the pump colors from the two narrow bands around $\lambda_1$ and $\lambda_2$ to a broadband source. The Raman process would be efficiently excited as $\lambda_2$ would seed Raman scattering from $\lambda_1$.

The following examples illustrate these embodiments.

Example 1

An Er:YAG microchip laser operating with a pulse width of greater than 10 ps and less than 2 ns and wavelength around 2.8 μm converted in a periodically poled gallium arsenide crystal to generate a long wavelength laser pulse at 5 um. The pulses are launched into a solid core clad As—Se fiber where a supercontinuum is generated from 2 to 14 μm through a combination of Raman conversion and self phase modulation.

Example 2

The system described in Example 1 where no nonlinear element is used and the laser is coupled directly into a chalcogenide fiber such as $As_2S_3$ fiber. The pulses are launched into a solid core clad As—S fiber where a supercontinuum is generated from ~2.8 to 6 μm through a combination of Raman conversion and self-phase modulation.

Example 3

A quantum cascade laser with peak power levels exceeding 1 W or average power continuous wave power exceeding 10 mW is coupled directly into a photonic crystal fiber of AsSe. The effective diameter of the AsSe fiber is designed to magnify the nonlinear parameter and reduce the required power level for supercontinuum generation to below 10 W.

Example 4

A device whereas the pump laser is transition metal doped chalcogenide crystal (or ceramic) q-switched laser such as Cr:ZnSe, operating around 2.4 μm with pulse width below 2 ns. A nonlinear crystal element such as ZGP which converts the wavelength of the pump into the mid-infrared or far-infrared and is coupled into a solid core AsSe fiber.

Example 5

A system composed of a compact laser pump source, a nonlinear element and an infrared fiber. The laser pump source (either a microchip laser based on one of the previously described compositions or a quantum cascade laser with a peak power greater than 10 W) operating at a repetition rate from CW to MHz, a nonlinear element for shifting the pump power to a wavelength which will not have significant two-photon absorption in a fiber. Example of such elements are quasi-phase matched crystals as those previously described, Raman shifters, and nonlinear crystals such as those previously described. An infrared fiber (such as those of material composition previously described) wherein the incident wavelength propagates in normal or anomalous regime, and broadens to at least 100% of the incident bandwidth.

Example 6

A system composed of a compact laser pump source and an infrared fiber. The laser pump source (either a microchip laser based on one of the previously described compositions or a quantum cascade laser with a peak power greater than 10 W) operating at a repetition rate from CW to MHz, without a nonlinear element for shifting the pump as the pump wavelength already did not display two-photon absorption in the fiber. The infrared fiber (such as those of material composition previously described) wherein the incident wavelength propagates in normal or anomalous regime, and broadens to at least 100% of the incident bandwidth.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A device for generating a supercontinuum in an infrared fiber with a compact light source, comprising:
   a single pulsed microchip laser having an input laser bandwidth, wherein said laser operates with a wavelength of 1.0 micrometers or greater;
   a bulk nonlinear optical element operated without a cavity; and
   an infrared fiber transparent in the infrared;
   wherein light from said laser is wavelength shifted beyond the two-photon absorption of the infrared fiber through said bulk nonlinear optical element and launched into said infrared fiber to produce a broadband output having a bandwidth greater than said input laser bandwidth by at least 100% and an emission wavelength range from 2 to 14 micrometers.

2. The device of claim 1, wherein said laser comprises optically active elements Nd, Yb, Er, Dy, Pr, Sm, Eu, Ho, Tm, transition metal ions Cr or Fe, or any combination thereof.

3. The device of claim 1, wherein said bulk nonlinear optical element comprises periodically poled lithium niobate, periodically poled potassium titanyl phosphate, or periodically patterned gallium arsenide.

4. The device of claim 1, wherein said bulk nonlinear optical element comprises lithium triborate, beta barium borate, zinc germanium phosphide, potassium dihydrogen phosphate, silver thiogallate, silver selenogallate, gallium selenide, lithium indium sulfide, or lithium indium selenide.

5. The device of claim 1, wherein said bulk nonlinear optical element comprises a single-pass Raman converter.

6. The device of claim 1, wherein the infrared fiber is a chalcogenide glass fiber.

7. The device of claim 1, wherein the infrared fiber has an outer diameter in the range of 100 to 500 micrometers.

8. The device of claim 1, wherein the infrared fiber has a core size in the range of 1 to 100 micrometers in diameter.

9. The device of claim 1, wherein said laser has a pulse duration between 40 ps and 5 ns, and a repetition rate between 100 Hz and 100 MHz.

10. The device of claim 1, wherein the device weighs 20 kg or less, and wherein the device has dimensions of 20 cm×20 cm×20 cm or less.

11. The device of claim 1, wherein the infrared fiber has a core size in the range of 1 to 50 micrometers in diameter.

12. The device of claim 1, wherein said laser has a pulse duration between 100 ps and 2 ns, and a repetition rate between 10 kHz and 10 MHz.

* * * * *